3,492,731
GAGE FOR TENSIONING SAW BANDS
Vincent E. Diehl, Escondido, Calif., assignor to Do All Company, Des Plaines, Ill., a corporation of Illinois
Filed Sept. 3, 1968, Ser. No. 756,899
Int. Cl. G01b 5/00
U.S. Cl. 33—148      3 Claims

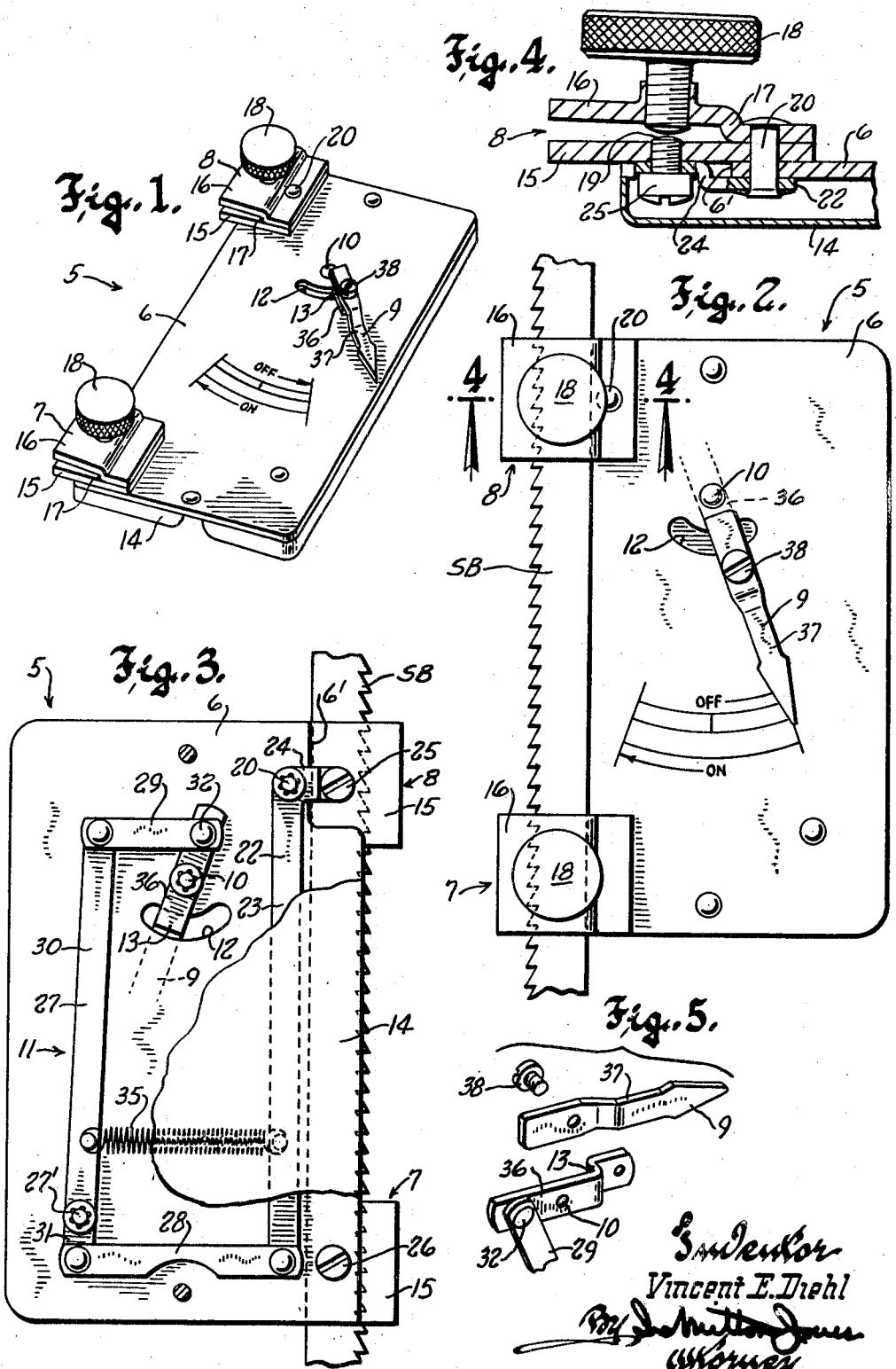

ABSTRACT OF THE DISCLOSURE

A gage for indicating stretch of a band saw blade as it is tensioned on a band sawing machine has a flat, rectangular body across the front face of which a pointer swings. Two clamps are engageable with the saw band, one immovably fixed on the body, the other pivoted to the body and connected with a lever comprising part of motion amplifying linkage overlying the rear face of the body and connected with the pointer.

---

This invention relates broadly to strain gages, and has for its purpose and object the provision of a relatively simple and inexpensive mechanical strain gage that is particularly adapted for use in tensioning the endless cutting blades of band saws.

It is well known that the blade of a band sawing machine should be properly tensioned when the machine is in use in order to assure that the blade will have a long life and will produce smooth and accurate cuts. The tension of the blade can be regulated by adjustingly moving one of the band wheels toward and from the other while observing a strain gage that accurately measures the stretching and contraction of a length of the cutting stretch of the blade in response to the varying tension forces being applied to it.

Heretofore it was customary to use a conventional dial gage to measure the stretch of the blade as it was tensioned; but dial gages are primarily intended for taking heightwise measurements perpendicular to a surface. Hence, they are not well adapted for taking measurements parallel to a surface, i.e., in directions lengthwise of and parallel to the faces of a saw band. The use of a dial gage to measure stretch in a saw blade was therefore, somewhat of a makeshift expedient, and while it could provide fairly satisfactory measurements, its use involved careful and time consuming preparation; and of course dial gages are expensive instruments.

By contrast, the present invention provides a tension gage for saw blades and the like that is compact, sturdy, simple and inexpensive; but most of all, it provides a gage that is easy to use and requires no elaborate set up to adapt it for use.

A significant attribute of the invention is that the gage is actually clamped to the saw blade at lengthwise spaced points thereon, and hence, when in use, the gage is entirely independent of all parts of the machine except the blade being tensioned.

The gage consists essentially of a generally flat rectangular body, a pair of saw band gripping clamps, one fixed and the other movable, projecting edgewise from one of the longer side edges of the body, a pointer that swings across the front face of the body, and a very simple and sturdy motion amplifying linkage that connects the movable clamp with the pointer and overlies the rear face of the body, to translate slight increase in the spacing of the clamps due to stretch in the blade to which the gage is attached, into an appreciable and proportional motion of the pointer.

With these observations and objects in mind, the manner in which the invention achieves its purpose will be appreciated from the following description and the accompanying drawing. This disclosure is intended merely to exemplify the invention. The invention is not limited to the particular structure disclosed, and changes can be made therein which lie within the scope of the appended claims without departing from the invention.

The drawing illustrates one complete example of the physical embodiment of the invention constructed according to the best mode so far devised for the practical application of the principles thereof, and in which:

FIGURE 1 is a front perspective view of the tension indicator of this invention;

FIGURE 2 is a front view of the tension indicator attached to a saw blade that is about to be tensioned;

FIGURE 3 is a rear view of the indicator with part of its cover broken away;

FIGURE 4 is a cross sectional view through FIGURE 2 on the plane of the line 4—4; and FIGURE 5 is a perspective view of the pointer per se.

Referring now more particularly to the accompanying drawings, the numeral 5 designates generally the tension indicator of this invention, which comprises a body 6, a pair of clamps 7 and 8 that project from one of the edges of the body and are detachably securable to a saw blade SB at lengthwise spaced locations along its cutting stretch, a pointer 9 that is pivotally mounted on the body as at 10 to swing back and forth across the front face of the body, and a motion amplifying linkage 11 which overlies the rear face of the body and by which relative motion of the clamps 7 and 8 toward and from one another is translated into swinging motion of the pointer 10.

The body 6 can be stamped from stiff sheet metal as in the present case or formed of plastic. It is generally rectangular in shape but has one of its corners notched out, as at 6', and an arcuate slot 12 in its medial portion, concentric to the axis about which the pointer swings, to accommodate an offset 13 in the pointer. This offset enables the inner mounted end portion of the pointer to be at the rear of the body while its outer free end portion overlies the front face of the body which constitutes a reference face and preferably has indicia thereon with which the pointer cooperates to signify values of blade tension. Collision of the offset 13 with the ends of the arcuate slot, obviously defines the limits of swinging motion of the pointer.

The motion amplifying linkage 11 and is connection with the pointer 10 overlie the rear faces of the body, and a protective cover 14 suitably secured to the body coacts therewith to enclose the linkage.

Each of the clamps 7 and 8 comprises a pair of rigid overlying plate members 15 and 16 solidly joined together at one edge portion thereof, but otherwise spaced apart to receive a saw blade therebetween. Although the clamps can be formed of a single piece of metal, in the present structure they are separate pieces, welded together, the member 15 being flat throughout its area and the member 16 being stepped, as at 17, to provide a shoulder against which the back edge of the widest saw blade for which the indicator gage is designed engages when properly positioned in the clamps.

A thumb screw 18 threaded in the plate member 16 of each clamp serves as a movable jaw for the clamp, and cooperates with the plate member 15, which can be considered a stationary jaw to grip the blade therebetween upon tightening of the screw.

Attention is directed to the fact that the thumb screws engage the saw blade at a small localized area, and that the stationary jaws, i.e. the plate members 15, have slight protuberances 19 rising from their inner surfaces coaxially with the thumb screws. Accordingly, the clamps can rotate about the axes of their thumb screws without losing their grip upon the blade. This is not important at the clamp 7, which is rigid with the body, but is significant at the clamp 8, which is pivotally joined to the body by a stud 20 and must rock about its pivotal connection with the body as it moves with respect to the other clamp during use of the indicator.

The slight rocking movement of the clamp 8 which results from change in the length of that portion of the saw blade between the two points thereon that are gripped by the clamps, is greatly amplified by the linkage 11 which connects the movable clamp 8 with the pointer. This linkage includes a bell crank lever 22 having a long arm 23 and a much shorter arm 24. The bell crank is pivotally mounted on the stud 20 and hence swings about the axis on which the clamp 8 rocks, with its long arm extending generally parallel to and near the adjacent side edge of the body in which the notch 6' is located, and its shorter arm projecting substantially transversely to said edge and into the notch.

The end of the shorter arm 24 is pivotally connected to the movable clamp by a screw 25 which passes through the shorter arm and is threaded into the plate member 15 of the clamp 8. To allow the bell crank lever 22 to lie flat against the rear face of the body and also permit the free end portion of its shorter arm to lie flat against the clamp 8, the shorter arm is offset and accommodated by the notch 6'.

The end of the screw 25 protrudes slightly above the inner face of the plate 15 of the clamp 8 to provide the protuberance 19 for that clamp. A similar screw 26 passing through the body and threaded into the plate 15 of the clamp 7 provides the protuberance for that clamp.

In addition to the bell crank lever 22, the motion amplifying linkage comprises a medially pivoted straight lever 27 near the opposite longitudinal edge of the body and generally parallel thereto, a link 28 connecting the long arm of the bell crank lever 22 with one end of the straight lever 27, and a shorter link 29 connecting the other end of the straight lever with the pointer 9. All elements of this linkage move parallel to the rear face of the body.

The pivotal connection 27' between the straight lever 27 and the body 6 is located close to the end of the straight lever that is connected to the link 28, so that said straight lever has a long arm 30 and a shorter arm 31.

The pivotal connection 10 between the pointer and the body is intermediate the offset portion 13 of the pointer and the pivotal connection 32 between the pointer and the link 29.

The long arm of the bell crank lever 22 can be ten times as long as the shorter arm thereof, and the longer arm 30 of the straight lever 27 can be eight times as long as its shorter arm 31. If then, the length of the pointer that is outward of its pivot 10 is five times as great as the distance between its pivot and its connection 32 with the shorter link 29, any relative converging or diverging motion of the clamping members 7 and 8 will effect a motion of the pointer tip which is four-hundred times as great as the relative motion between the clamping members. Because of the magnitude of this amplification, even the small motion of the clamping members that is due to stretching of the length of saw blade intervening the points gripped by the clamps, as the tension on the blade is adjusted, is quite substantial.

In using the indicator to adjust the tension of a saw blade, slack in the blade is first taken up. The clamps 7 and 8 are then slipped onto the back edge of the blade. With the indicator located so that the thumb screws are substantially midway between the front and back edges of the blade, the thumb screw of the clamp 7 is tightened. This secures the body of the indicator gage to the blade. The other (movable) clamp 8 is then pushed upwardly away from the fixed clamp to bring the pointer to the "off" position on the dial or indicia delineated on the reference face of the body, and with the clamp thus held its thumb screw is tightened. The indicator gage is now ready to show any increase in tension on the saw blade during adjustment thereof, which is depicted by the pointer swinging across the dial. As it moves from its "off" location, its position at all times provides an indication of the tension on the blade.

As noted hereinbefore the limits of swinging motion of the pointer, are defined by the arcuate length of the slot 12, since the offset portion 13, of the pointer collides with the ends of the slot; and preferably the pointer and, for that matter, the entire linkage by which motion is imparted to the pointer, is biased to the condition in which the distance between the clamps is minimum and the pointer is at its defined limit of swinging motion nearest the "off" position on the dial. Such bias can be supplied in any suitable way, but is conveniently obtained by connecting one or more tension springs 35 across the medial portions of the straight lever 27 and the long arm of the bell crank lever 22.

While the pointer can be one single stamping, it has been found desirable to make it in two parts as best shown in FIGURE 5. This permits the inner pivoted end portion 36 of the pointer which is actually part of the linkage 11 and includes the offset 13, to be formed of heavier stock than its outer free end portion 37. The two parts are secured together by a screw 38 which may be done after assembly.

From the foregoing description taken with the accompanying drawing, it will be apparent that this invention provides a very compact, convenient and inexpensive tension gage for use in obtaining the proper tension adjustment for a saw blade on a band sawing machine or the like.

What is claimed as my invention is:

1. A readily portable mechanical stretch gage for use in adjusting the tension on the blade of a band saw, comprising:
   (A) a flat plate-like body member having front and back faces and a front edge that is substantially straight;
   (B) a pointer pivoted to the body member to swing across its front face and coact with indicia thereon;
   (C) a pair of clamps mounted on the body member in juxtaposition to and spaced apart long the length of its front edge which the mouths of the clamps at the front ends thereof and the rear end portions of the clamps inwardly of said edge,
      each of said clamps comprising overlying, upper and lower arms rigidly connected at the rear end portions of the clamps but otherwise spaced apart a distance to freely receive therebetween a saw blade which enters the mouths of the clamps as the clamps are engaged with the blade,
      the lower arms of the clamps being seated on the front face of the body member;
   (D) a clamping screw threaded into the upper arm of each clamp with the end of the screw protruding from the underside of the upper arm to coact with the lower arm in gripping and securing the clamp to a saw blade;
   (E) means rigidly fixing one of said clamps to the body member so that upon engagement of the clamps onto a saw blade and securement of said fixed clamp to the saw blade the gage becomes fixed to the blade with its body member projecting from one edge of the blade;
   (F) pivot means forming the sole mounting of the other one of said clamps on the body member so that said clamp is pivotable,
      the axis of said pivot means being perpendicular to the front face of the body member and being located near but inwardly of the front edge thereof and passing through the rear end portion of said pivoted clamp so that the front end portion of said clamp may swing towards and from the fixed clamp;

(G) motion amplifying linkage connecting the pivoted clamp with the pointer and through which slight pivotal motion of the pivoted clamp is translated into a large motion of the pointer, said linkage including a medially pivoted lever having a long arm and a short arm arranged to swing across the back face of the body member and pivoted to the body member by the same pivot means which mounts the pivoted clamp, the short arm of said lever projecting forwardly of the adjacent part of the front edge of the body member and underlying the lower arm of the pivoted clamp; and (H) a pivot connecting the short arm of said lever with the lower arm of the pivoted clamp.

2. The gage of claim 1, wherein the pivot which connects the short arm of said lever with the lower arm of the pivoted clamp is coaxial with the clamping screw of the pivoted clamp, and further characterized by said pivot having a portion thereof rising above the upper surface of the lower arm of the clamp to form a small protuberance which coacts with the end of the clamping screw in gripping the blade and holds the blade off the upper surface of the lower arm of the pivoted clamp and thereby minimizes frictional resistance to pivotal motion of said clamp resulting from slight changes in length of the portion of the blade spanning the two clamps.

3. The gage of claim 1 wherein the motion amplifying linkage is at the back face of the body member, and further characterized by a cover member overlying the back face of the body member and coacting therewith to provide a protective casing for the linkage.

References Cited

UNITED STATES PATENTS 2,452,860  11/1948  Mostertz _____ 33—148
1,133,300  3/1915  McGauley _____ 33—148

FOREIGN PATENTS 340,526  12/1930  Great Britain.

SAMUEL S. MATTHEWS, Primary Examiner